United States Patent
Kong et al.

(10) Patent No.: US 6,754,050 B2
(45) Date of Patent: Jun. 22, 2004

(54) SHARED POLE DESIGN FOR REDUCED THERMAL POLE TIP PROTRUSION

(75) Inventors: Vee Sochivy Kong, Richfield, MN (US); Declan Macken, Prior Lake, MN (US); Huy Xuan Pham, Plymouth, MN (US); Ladislav Rudolf Pust, Savage, MN (US)

(73) Assignee: Seagate Technology LLC, Scotts Valley, CA (US)

(*) Notice: Subject to any disclaimer, the term of this patent is extended or adjusted under 35 U.S.C. 154(b) by 29 days.

(21) Appl. No.: 10/322,888

(22) Filed: Dec. 18, 2002

(65) Prior Publication Data

US 2003/0231435 A1 Dec. 18, 2003

Related U.S. Application Data

(60) Provisional application No. 60/389,054, filed on Jun. 14, 2002.

(51) Int. Cl.[7] .................................................. G11B 5/39
(52) U.S. Cl. ........................................................ 360/317
(58) Field of Search ................................. 360/317, 125, 360/126

(56) References Cited

U.S. PATENT DOCUMENTS

| | | | |
|---|---|---|---|
| 5,490,028 A | 2/1996 | Ang et al. | 360/126 |
| 5,896,243 A | 4/1999 | Koshikawa et al. | 360/103 |
| 5,896,244 A | 4/1999 | Watanabe et al. | 360/103 |
| 5,898,542 A | 4/1999 | Koshikawa et al. | 360/103 |
| 5,949,627 A | 9/1999 | Williams et al. | 360/126 |
| 6,078,455 A | 6/2000 | Enarson et al. | 360/68 |
| 6,222,702 B1 | 4/2001 | Macken et al. | 360/128 |
| 6,337,783 B1 * | 1/2002 | Santini | 360/317 |
| 6,366,428 B1 | 4/2002 | Yamanaka et al. | 360/126 |
| 6,624,970 B1 * | 9/2003 | Sasaki | 360/126 |
| 2002/0006018 A1 | 1/2002 | Narumi et al. | 360/317 |
| 2002/0012195 A1 | 1/2002 | Lahiri et al. | 360/97.01 |

* cited by examiner

*Primary Examiner*—David Davis
(74) *Attorney, Agent, or Firm*—Kinney & Lange, P.A.

(57) ABSTRACT

A data transducer having an air bearing surface is used to reduce thermal pole tip protrusion. The data transducer includes a write via and a top pole having one end adjacent the air bearing surface and an opposite end contacting the write via. The yoke extends from the write via in two directions towards the air bearing surface and is recessed from the air bearing surface. The yoke has a first end and a second end. The data transducer includes a shared pole adjacent the air bearing surface and co-planar to the yoke wherein a gap is located between the shared pole and the yoke. A shared pole extension extends between the shared pole and the first and second ends of the yoke.

19 Claims, 6 Drawing Sheets

SHARED POLE DESIGN FOR REDUCED THERMAL POLE TIP PROTRUSION

CROSS-REFERENCE TO RELATED APPLICATION(S)

This application claims priority from provisional application No. 60/389,054 filed Jun. 14, 2002, for "SHARED POLE DESIGN FOR REDUCED THERMAL POLE TIP RECESSION" by Vee Sochivy Kong, Declan Macken, Huy Xuan Pham, and Ladislav Rudolf Pust.

BACKGROUND OF THE INVENTION

The present invention relates generally to the field of magnetic data storage and retrieval. In particular, the present invention relates to a thin-film transducing head having a two-piece shared pole design to reduce thermal pole tip protrusion.

In a magnetic data storage and retrieval system, a thin-film transducing head typically includes a transducer, a substrate upon which the transducer is built, and an overcoat deposited over the transducer. The transducer generally consists of two portions, a writer portion for storing magnetically-encoded information on a magnetic disc and a reader portion for retrieving that magnetically-encoded information from the disc. The reader portion typically consists of a bottom shield, a top shield, and a magnetoresistive (MR) sensor positioned between the bottom and top shields. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

The writer portion typically consists of a top and bottom pole, which are separated from each other at the air bearing surface of the writer by a gap layer and which are connected to each other at a region distal from the air bearing surface by a back via, or write via. The air bearing surface is the surface of the recording head immediately adjacent the magnetic media or disc. Positioned between the top and bottom poles are one or more layers of conductive coils encapsulated by insulating layers. The writer portion and the reader portion are often arranged in a merged-configuration in which a shared pole serves as both the top shield in the reader portion and the bottom pole in the writer portion.

To write data to the magnetic media, an electrical current is caused to flow through the conductive coils to thereby induce a magnetic field across the write gap, between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

The layers of the transducer, which include both metallic and insulating layers, all have differing mechanical and chemical properties from the substrate. These different properties affect several aspects of the transducer performance. First the layers of the transducing head will be lapped at different rates. Thus, when an air bearing surface (ABS) of the transducing head is lapped during its fabrication, different amounts of the layers will be removed, resulting in the transducing head having an uneven ABS. Commonly, a greater amount of the metallic layers of the transducer will be removed during the lapping process than will be removed from the substrate. Thus, this lapping process results in a pole tip recession (PTR) of the metallic layers of the transducer with respect to the substrate. The PTR of a particular layer is defined as the distance between the air bearing surface of the substrate and the air bearing surface of that layer.

Another difference in the properties of the substrate and the transducer layers occurs as the magnetic data storage and retrieval system is operated. During operation, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer. The coefficient of thermal expansion (CTE) of materials used in forming the substrate is typically much smaller than the CTE of the materials used in forming the metallic layers of the transducer. Due to the larger CTE of the transducer's metallic layers, those layers will tend to expand a greater amount in response to higher temperatures than the substrate. Thus, when the transducing head is subjected to high operating temperatures, the metallic layers normally protrude closer to the disc than the substrate, thereby affecting the PTR of the transducer. This change in PTR caused by temperatures is referred to as the Thermal PTR (TPTR).

During operation of the magnetic data storage and retrieval system, the transducing head is positioned in close proximity to the magnetic media. The distance between the transducer and the media is preferably small enough to allow for writing to and reading from magnetic media with a large areal density and great enough to prevent contact between the magnetic media and the transducer. Performance of the transducer depends primarily on this distance.

To keep the distance between the transducing head and the magnetic media constant, PTR should not change significantly with temperature. If TPTR is large, then the spacing between the transducer and the media will change significantly with temperature, thereby requiring the low-temperature fly height to be high enough to accommodate this variation at higher operating temperatures. On the other hand, if TPTR is close to zero, the low-temperature fly height can be reduced.

As areal density of the magnetic media increases, the requirements for transducing head fly height become such that TPTR takes up a significant portion of the head disc spacing. Much of the TPTR originates from the top and bottom shields, which constitute much of the metal exposed at the ABS. The mismatched CTE between the materials of the transducing head, in particular the shields, and the material of the substrate give rise to the PTR. One method to reduce this effect is to reduce the volume of the shields photolithographically. This is relatively a simple matter where the bottom shield is concerned, however, for heads featuring a shared pole, or top shield and bottom pole which are defined during the same photo step, there is a fundamental limitation in that the structure has to be long enough to reach the writer via and thereby complete the magnetic circuit to the top pole.

The present invention is a transducing head structure that reduces the TPTR when the transducing head is operated at high temperatures and also maintains a complete magnetic circuit between the bottom pole and the top pole.

BRIEF SUMMARY OF THE INVENTION

The present invention relates to a data transducer having an air bearing surface. The data transducer includes a write via and a top pole having one end adjacent the air bearing surface and an opposite end contacting the write via. A yoke extends from the write via in two directions towards the air bearing surface and is recessed from the air bearing surface. The yoke has a first end and a second end. A shared pole is located adjacent the air bearing surface and co-planar to the yoke wherein a gap is located between the shared pole and the yoke. A shared pole extension extends between the shared pole and the first and second ends of the yoke.

DETAILED DESCRIPTION

Figure 1:
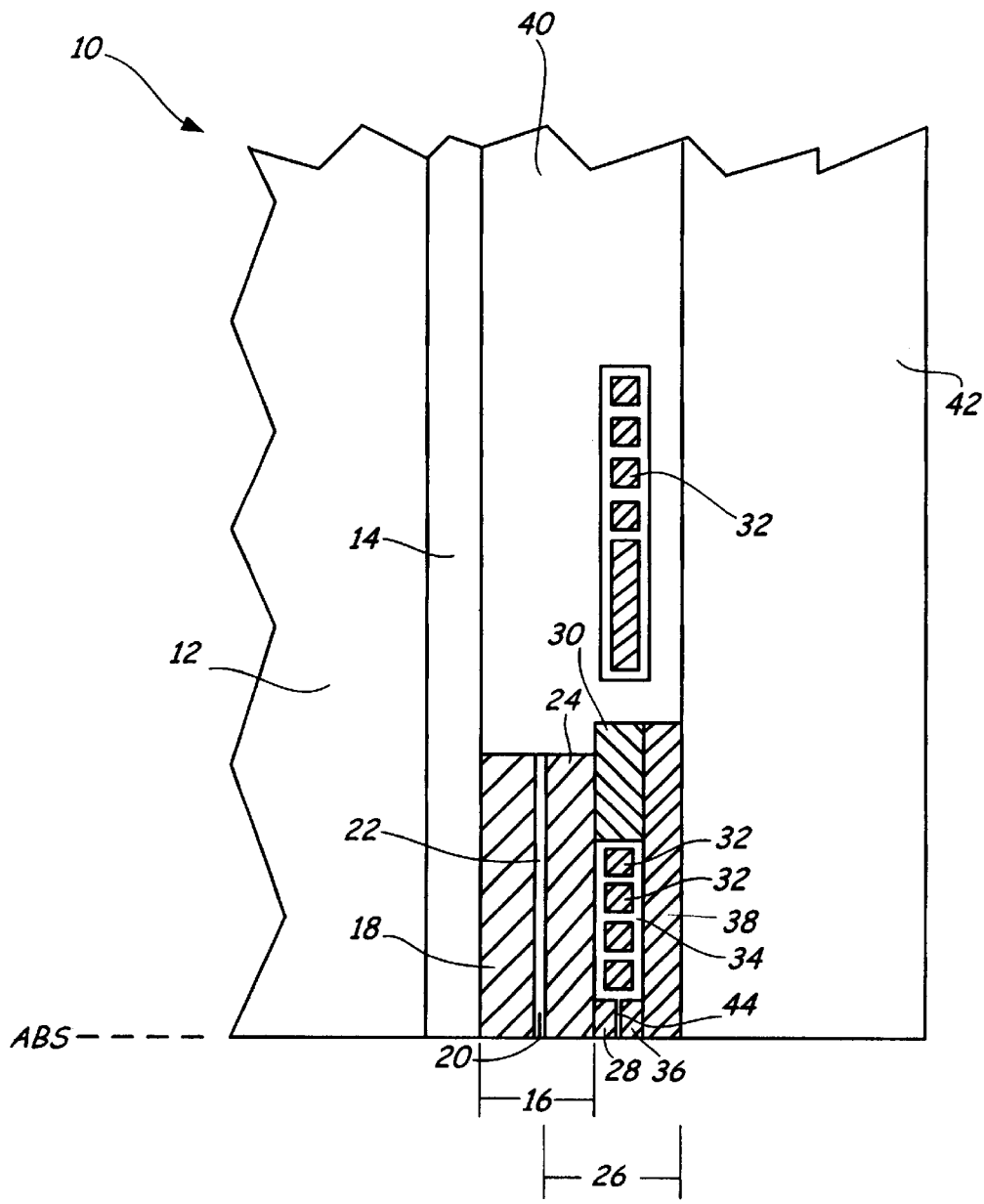
FIG. 1 is a partial cross-sectional view of a transducing head in accord with the prior art.

FIG. 1 is a partial cross-sectional view of a transducing head 10 in accord with prior art transducing head. The cross-section of FIG. 1 is taken substantially normal to an air bearing surface (ABS) of transducing head 10. Transducing head 10 includes a substrate 12, a basecoat 14, a reader 16 (which includes a bottom shield 18, a read element 20, a read gap 22, and a shared pole 24), a writer 26 (which includes shared pole 24, a bottom pole tip 28, a back via 30, a conductive coil 32, a coil insulator 34, a top pole tip 36, and a top pole 38), an insulating layer 40, and an overcoat 42.

Basecoat 14 is deposited on substrate 12. Reader 16 and writer 26 are each multilayered devices which are stacked upon basecoat 14 adjacent the ABS of transducing head 10. As shown in FIG. 1, reader 16 is formed on basecoat 14, and writer 26 is both stacked on and merged with reader 16. In other embodiments not illustrated, reader 16 and writer 26 may be arranged in a piggyback configuration (in which layers are not shared between the two elements) and where writer 26 may be formed on basecoat 14 (with reader 16 being formed on writer 26). Co-planarly positioned with the layers of reader 16 and writer 26, and opposite the ABS of transducing head 10, is insulating layer 40. Overcoat 42 is formed on writer 26 and on insulating layer 40.

Substrate 12 is typically formed of an electrically-conductive, ceramic material such as AlTiC, TiC, Si, SiC, $Al_2O_3$, or other composite materials formed of combinations of these materials. Of these materials, AlTiC and TiC have relatively large coefficients of thermal expansion (CTE), typically in the range of about $7.0 \times 10^{-6}/°$ C. to about $8.3 \times 10^{-6}/°$ C., while silicon has a lower CTE, in the range of about $2.3 \times 10^{-6}/°$ C. to about $2.4 \times 10^{-6}/°$ C.

Basecoat 14 is formed upon substrate 12 and is generally formed of an insulating material, such as $Al_2O_3$, AlN, $SiO_2$, $Si_3N_4$, and $SiO_{0-2}N_{0-1.5}$. Generally, the insulating material for basecoat 14 is selected to most closely match the chemical and mechanical properties of the material used as substrate 12. For example, an $Al_2O_3$ basecoat is commonly used in conjunction with an AlTiC substrate, since the two materials have similar CTEs.

Reader 16 is formed on basecoat 14 and includes bottom shield 18, read element 20, read gap 22, and shared pole 24. Read gap 22 is defined on the ABS between terminating ends of bottom shield 18 and shared pole 24. Read element 20 is positioned in read gap 22 adjacent the ABS. Read gap 22 insulates read element 20 from bottom shield 18 and shared pole 24. Read element 20 may be any variety of different types of read elements, such as an anisotropic magnetoresistive (MR) read element or a giant magnetoresistive (GMR) read element. In operation, a magnetic flux from a surface of magnetic media causes rotation of a magnetization vector of MR read element 20, which in turn causes a change in electrical resistivity of MR read element 20. The change in resistivity of read element 20 can be detected by passing a current through read element 20 and measuring a voltage across read element 20.

Writer 26 is formed on reader 16, and includes shared pole 24, bottom pole tip 28, back via 30, conductive coil 32, coil insulator 34, top pole tip 36, and top pole 38. Bottom pole tip 28 and back via 30 are formed on shared pole 24, with bottom pole tip 28 being positioned adjacent the ABS and back via 30 being spaced away from the ABS. A write gap 44 is defined on the ABS between bottom pole tip 28 and top pole tip 36. Top pole 38 is formed over top pole tip 36 and extends from the ABS to back via 30. Conductive coil 32 is positioned in coil insulator 34 between shared pole 24 and top pole 38, wrapping around back via 30 such that the flow of electrical current through conductive coil 32 generates a magnetic field across write gap 44.

Transducing head 10 is a merged-head configuration in which shared pole 24 serves as a top shield for reader 16 and a bottom pole for writer 26. Transducing head 10 may also be arranged in a piggy back configuration in which the top shield of reader 16 and the bottom pole of writer 26 are made of separate layers (shown in FIG. 6), or in a merged-head configuration in which reader 16 is built upon the writer (not illustrated).

Each of bottom shield 18, shared pole 24, a shared pole extension (shown in FIG. 2), bottom pole tip 28, back via 30, top pole tip 36, and top pole 38 are formed of metallic materials. Preferably, each of these components is formed of an alloy primarily composed of Fe and Ni, or Fe, Ni, and Co. Such metallic alloys typically have large CTEs. For example $Ni_{79}Fe_{21}$ has a CTE of about $12.2 \times 10^{-6}/°$ C.

Read gap 22 is generally formed of an insulating material, such as $Al_2O_3$ or silicon nitride. Coil 32 is generally formed of an electrically conductive metal, such as copper, gold, or silver. Most commonly used is copper, which has a CTE of about $16.5 \times 10^{-6}/°$ C. Coil insulator 34 is generally formed from a cured photoresist $Al_2O_3$ having a large CTE, or from other insulating materials, such as AlN, $SiO_2$, or $Si_3N_4$.

Not shown in FIG. 1 are electrical leads and contacts to read element 20 and coil 32. The electric leads and contacts are typically formed of metals, such as gold or tantalum, or metallic alloys.

Insulating layer 40 is positioned in-plane with layers of reader 16 and writer 26 of transducing head 10, opposite the ABS. Insulating layer 40 is preferably formed of an insulating material such as $Al_2O_3$, AlN, $SiO_2$, $Si_3N_4$, and $SiO_{0-2}N_{0-1.5}$. The following table identifies several common insulating materials and their properties. The exact values in the table may vary depending upon processing and manufacturing conditions.

| Material | CTE [$10^{-6}$/° C.] | Young's Modulus [GPa] | Poisson's Ratio [1] |
| --- | --- | --- | --- |
| AlTiC | 7.9 | 380 | .22 |
| $Al_2O_3$ | 7.8 | 200 | .25 |
| Si | 2.6 | 163 | .22 |
| $Si_3N_4$ | 3.0 | 200 | .25 |
| AlN | 4.3 | 220 | .25 |
| SiC | 4.5 | 410 | .18 |
| $SiO_2$ | 1.0 | 58 | .25 |

Overcoat 42 is formed over top pole 38, exposed coil insulator 34, and insulating layer 40. Overcoat 42 is typically formed of an insulating material such as $Al_2O_3$, AlN, $SiO_2$, $Si_3N_4$, and $SiO_{0-2}N_{0-1.5}$.

The layers of transducing head 10 all have differing mechanical and chemical properties. Due to these different properties, the layers of transducing head 10 will be lapped at different rates. Thus, lapping of the ABS of transducing head 10 during fabrication results in transducing head 10 having an uneven ABS. Commonly, a greater amount of the metallic layers of transducing head 10 will be removed during the lapping process than will be removed from substrate 12, resulting in a pole tip recession (PTR) of the metallic layers with respect to substrate 12. The PTR of a particular layer is defined as the distance between the air bearing surface of substrate 12 and the air bearing surface of that layer.

The differing mechanical and chemical properties of the layers of transducing head 10 further affect the air bearing surface of transducing head 10 during operation thereof. The coefficient of thermal expansion (CTE) of material used in forming substrate 12 is typically much smaller than the CTE of materials used in forming the metallic layers of transducing head 10. Due to the larger CTE of the metallic layers, those layers tend to expand a greater amount than substrate 12. Thus, when transducing head 10 is subjected to high operating temperatures, the metallic layers tend to protrude closer to the magnetic disc than substrate 12, thereby affecting the PTR of the metallic layers of transducing head 10. This change is PTR caused by temperature is referred to as Thermal PTR (TPTR).

Much of the TPTR originates from the shield, which constitutes most of the metal exposed at the ABS. It is the mismatch in CTE between these metals and the substrate material that gives rise to the thermal protrusion. One method to reduce this effect is to reduce the volume of the shields as defined photolithographically, which is a simple matter where bottom shield 18 is concerned. However, for heads featuring a shared pole, or a merged top shield and bottom pole, which are defined during the same photo step, there is a fundamental limitation in that the structure has to be long enough to reach back via 30 and thereby complete the magnetic circuit to top pole 38.

Figure 2:
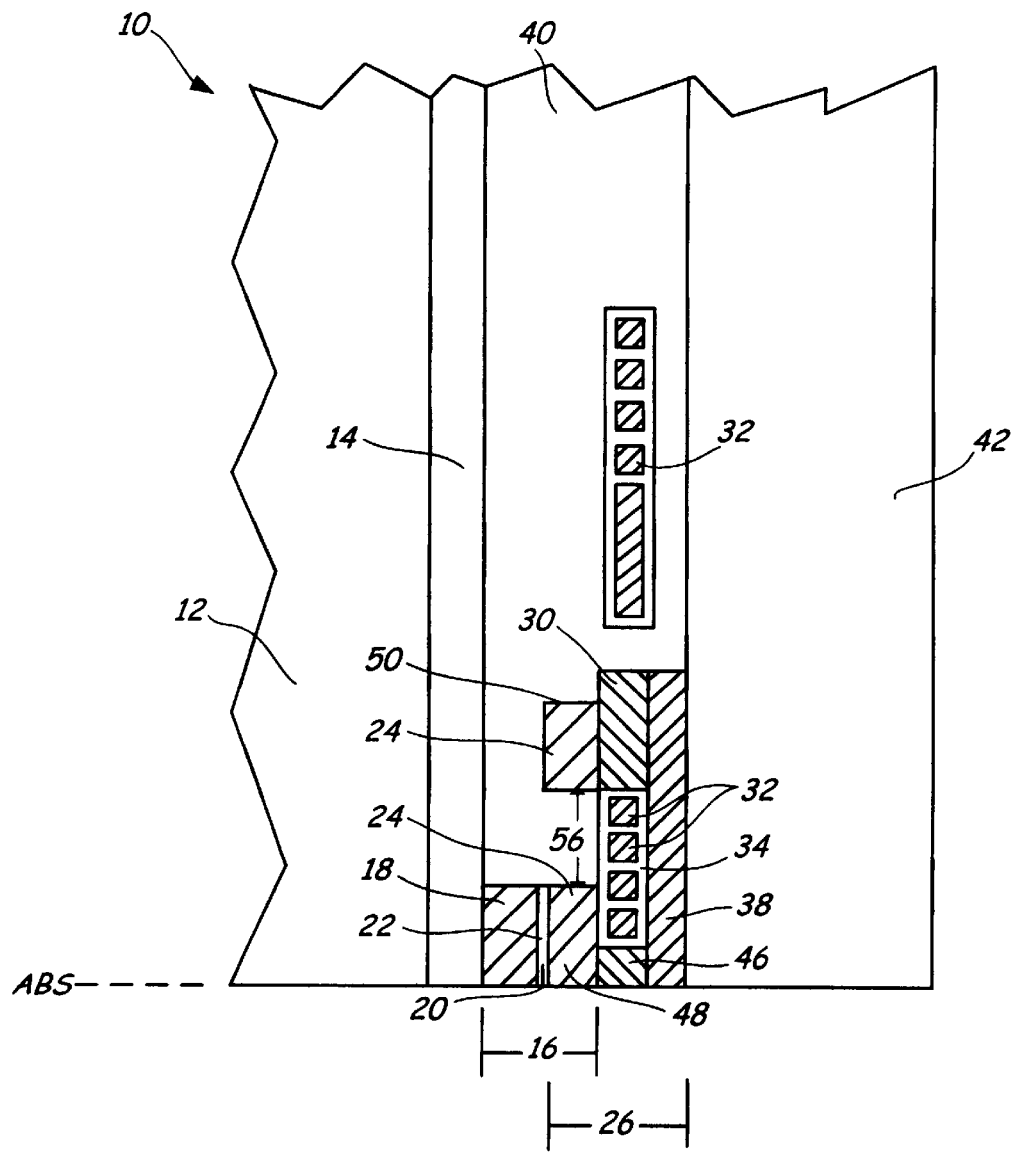
FIG. 2 is a partial cross-sectional view of a transducing head in accord with the present invention.

The present invention addresses the problem of TPTR by using a two-piece shared pole design in which the volume of bottom shield 18 and shared pole 24 are reduced to thereby reduce the volumetric contribution to the TPTR. In addition, a shared pole extension is used to complete the magnetic circuit to top pole 38. FIG. 2 is a partial cross-sectional view of transducing head 10 in accord with the present invention. The cross-section of FIG. 2 is taken substantially normal to the ABS of transducing head 10.

Transducing head 10 includes substrate 12, basecoat 14, reader 16 (which includes bottom shield 18, read element 20, read gap 22, and shared pole 24), writer 26 (which includes shared pole 24, a shared pole extension 46, back via 30, conductive coil 32, coil insulator 34, and top pole 38), insulating layer 40, and overcoat 42. Transducing head 10 shown in FIG. 2 is a merged-type configuration in which shared pole 24 serves as the top shield for reader 16 and the bottom pole for writer 26.

Shared pole 24 has two pieces, a shield portion 48 and a yoke portion 50. Shield portion 48 of shared pole 24 is formed upon bottom shield 18. Shield portion 48 is positioned adjacent the ABS and yoke portion 50 is recessed from the ABS and positioned opposite and co-planar to shield portion 48 A gap 56, filled with insulating material, is formed between shield portion 48 and yoke portion 50. Shared pole extension 46 is positioned upon shield portion 48 of shared pole 24 and extends along the ABS and rearward from the ABS to contact yoke portion 50 as well (shown in FIG. 3).

Basecoat 14 is deposited on substrate 12. Reader 16 is formed on basecoat 14, and includes the one-piece bottom shield 18, read element 20, read gap 22, and the two-piece shared pole 24 (shield portion 48 and yoke portion 50). Read element 20 is positioned in read gap 22 adjacent the ABS. Read gap 22 is defined on the ABS between terminating ends of shield portion 48 of shared pole 24 and bottom shield 18. Writer 26 is formed on reader 16 and includes the two-piece shared pole 24, shared pole extension 46, back via 30 (or write via), conductive coil 32, coil insulator 34, and top pole 38. Shared pole extension 46 is formed upon shield portion 48 of shared pole 24. Back via 30 is formed on yoke portion 50 of shared pole 24. A write gap is defined between shared pole extension 46 and top pole 38 at the ABS. Top pole 38 is formed over shared pole extension 46 and extends from shared pole extension 46 at the ABS to back via 30. Conductive coil 32 is positioned in coil insulator 34 between top pole 38 and shield portion 48 of shared pole 24, wrapping around back via 30, such that the flow of electrical current to conductive coil 32 generates a magnetic field across the write gap.

Figure 3:
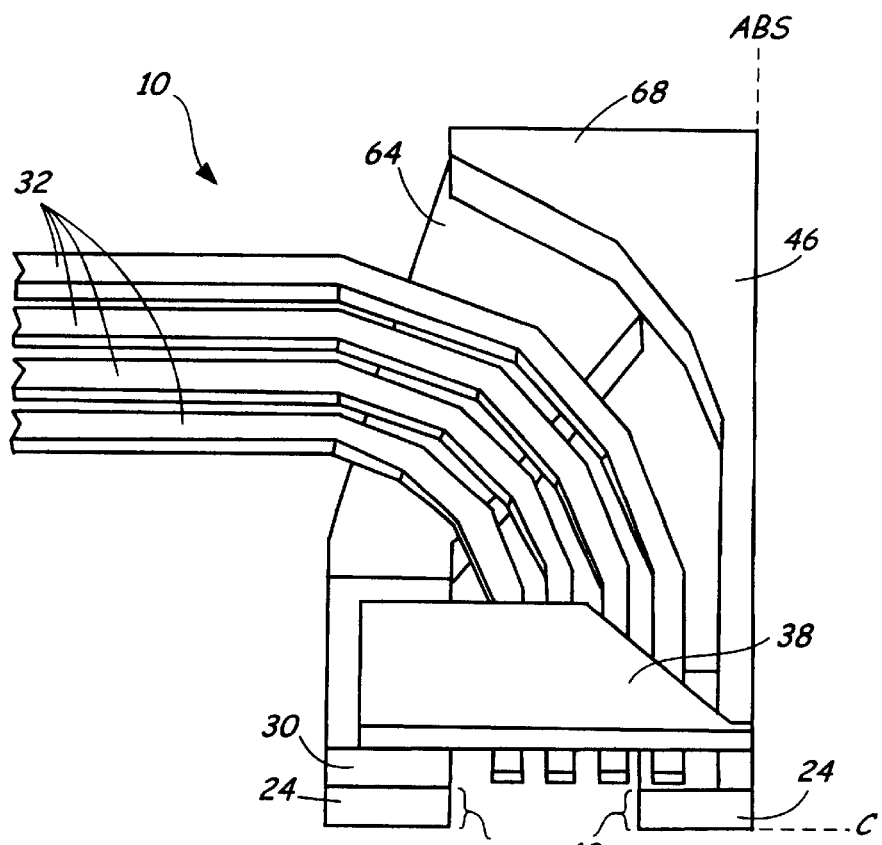
FIG. 3 is a top perspective view of a section of the transducing head of FIG. 2 cut along a centerline of the head.
Figure 4:
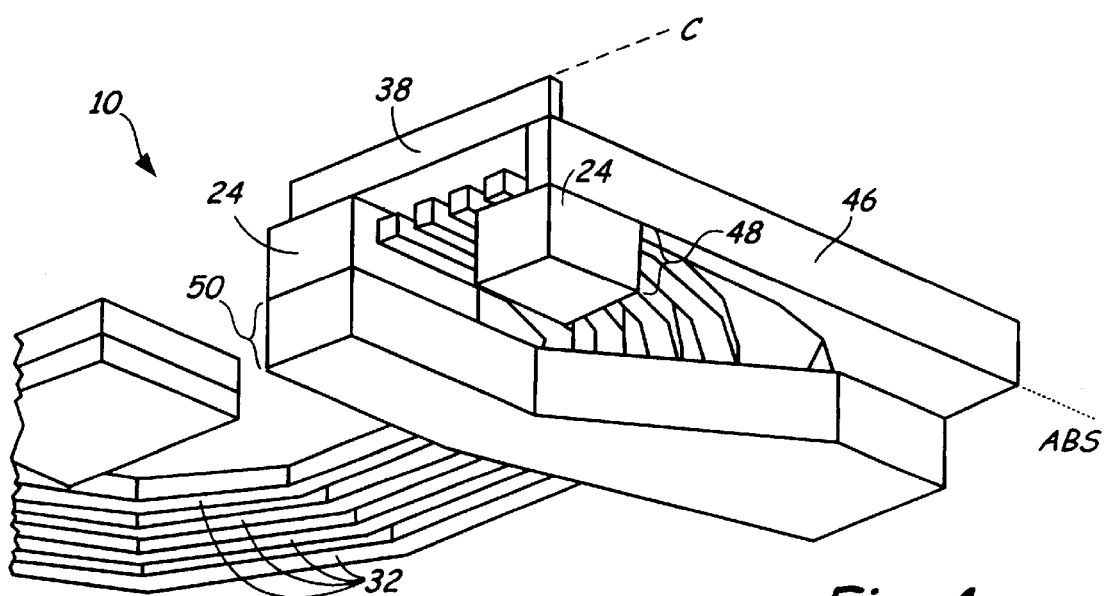
FIG. 4 is a bottom perspective view of a section of the transducing head of FIG. 2 cut along the centerline of the head.

FIG. 3 is a top perspective view of a section of transducing head 10 cut along a centerline C of head 10 and FIG. 4 is a bottom perspective view of the same section of transducing head 10 cut along centerline C. FIGS. 3 and 4 do not include all the necessary features of transducing head 10, such as substrate 12, basecoat 14, bottom shield 18 and insulating layer 40. To better illustrate the different layers of transducing head 10, only half of transducing head 10 is shown in FIGS. 3 and 4. The other half is a mirror image of the half shown in FIGS. 3 and 4, and is located on the opposite side of centerline C.

In FIGS. 3 and 4 a merged-head configuration of reader 16 and writer 26 is shown, in which shared pole 24 forms the top shield of the reader and the bottom pole of the writer. Positioned adjacent the ABS is shield portion 48 of shared pole 24. Recessed from the ABS, co-planar with and spaced apart from the shield portion 48 is yoke portion 50 of shared pole 24. Yoke portion 50 of shared pole 24 extends from centerline C of transducing head 10 in opposite directions, although only one end is shown in FIGS. 3 and 4, away from centerline C towards the ABS. However, yoke portion 50 remains recessed from the ABS.

Figure 5:
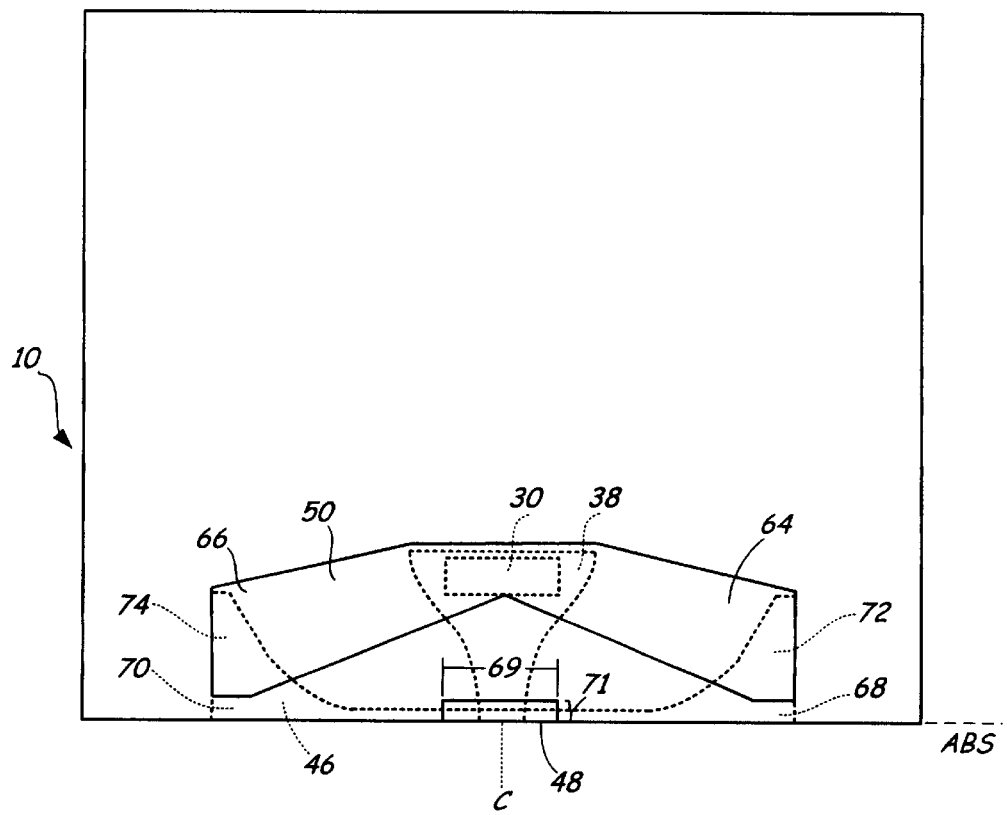
FIG. 5 is a bottom view of the transducing head of FIG. 2 showing various layers of the head.

Yoke portion 50 has a first end 64 and a second end 66 (shown in FIG. 5). Back via 30, or write via, is positioned upon yoke portion 50 of shared pole 24. Shared pole extension 46 is positioned upon shield portion 48 of shared pole 24 adjacent the ABS. Shared pole extension 46 extends from centerline C in opposite directions, although only first end 64 is shown in FIGS. 3 and 4, along the ABS. Shared pole extension 46 has a first end 68 and a second end 70 (shown in FIG. 5). At each end 68, 70 of shared pole extension 46 is a portion having a height greater than a height of shared pole extension 46, adjacent centerline C, at shield portion 48 of shared pole 24. First and second ends 68, 70 of shared pole extension 46 extend away from the ABS to contact ends 64, 66 of yoke portion 50. Top pole 38 is positioned on top of back via 30 and shared pole extension 46, such that top pole 38 extends from the ABS to back via 30.

Coil 32 is nested between top pole 38 and shield portion 48 of shared pole 24, and wraps around back via 30 such that the flow of electrical current through conductive coil 32 generates a magnetic field across the write gap. The magnetic circuit of writer 26 includes shield portion 48 of shared pole 24, shared pole extension 46, yoke portion 50 of shared pole 24, back via 30, and top pole 38. The magnetic flux flows through shield portion 48 of shared pole 24 to shared pole extension 46, to yoke portion 50 of shared pole 24, to back via 30, to top pole 38 and then back to shared pole extension 46 to complete the magnetic circuit from shared pole 24 to top pole 38. Shared pole extension 46 and yoke portion 50 of shared pole 24 maintain the complete magnetic circuit between shared pole 24 and top pole 38.

FIG. 5 is a bottom view of transducing head 10 showing multiple layers of transducing head 10 shown in FIGS. 3 and 4. In particular is shown yoke portion 50 of shared pole 24, write via 30, shield portion 48 of shared pole 24, shared pole extension 46, and top pole 38. Shield portion 48 is centered about centerline C of transducing head 10 adjacent the ABS. Preferably, shield portion 48 has a width 69 between about 12 microns and about 20.5 microns, and a height 71 between about 5 microns and about 10 microns. Yoke portion 50 is centered about centerline C of transducing head 10 and is recessed from the ABS. Yoke portion 50 extends outward from the centerline towards left and right edges of transducing head 10, and terminates at first and second ends 64, 66. In some embodiments, as seen in FIG. 5, yoke portion 50 is V-shaped such that first and second ends 64, 66 extend toward the ABS but remain recessed from the ABS.

Shared pole extension 46 is centered about centerline C of transducing head 10 and lies adjacent the ABS. Shared pole extension 46 includes a first portion 72 at first end 68 and a second portion 74 at a second end 70. First and second portions 72, 74 of shared pole extension 46 extend away from the ABS and contact the recessed first and second ends 64, 66 of yoke portion 50. First and second portions 72, 74 follow the contour of coils 32. Back via 30 is positioned above yoke portion 50, centered about centerline C. Top pole 38 contacts shared pole extension 46 and back via 30 to extend from the ABS to back via 30.

The V-shape of yoke portion 50 is the most efficient way to connect the yoke to shared pole extension 46, and thereby reduce the overall magnetic circuit length. A sufficient amount of overlap must occur between yoke portion 50 and shared pole extension 46 to transmit the magnetic flux of the circuit. A small overlap constrains the amount of flux that passes through the circuit.

Yoke portion 50 and shield portion 48 of shared pole 24 are two separate features which are defined during the same photo and plating steps for fabricating transducing head 10. The yoke is not exposed to the ABS, but does extend sufficiently along the ABS so as to connect with the left and right most portions, or first and second portions 72 and 74, of shared pole extension 46. By recessing yoke portion 50 from the ABS, its contribution to TPTR is minimized while the write function of transducing head 10 is retained because the magnetic circuit to top pole 38 is completed. In the same photo and plating layers as the yoke, the layers of shield portion 48 are formed. Since this structure is not part of the writer yoke, its dimensions may be defined by considerations other than completing the magnetic circuit of writer 26. Shield portion 48 is reduced in size, in particular the height, from prior art shared poles such that the volumetric contribution to TPTR is reduced. Reducing the height of shared pole 24 with respect to the ABS, reduces the shared pole's contribution to TPTR because the volume of high CTE material is reduced.

Figure 6:
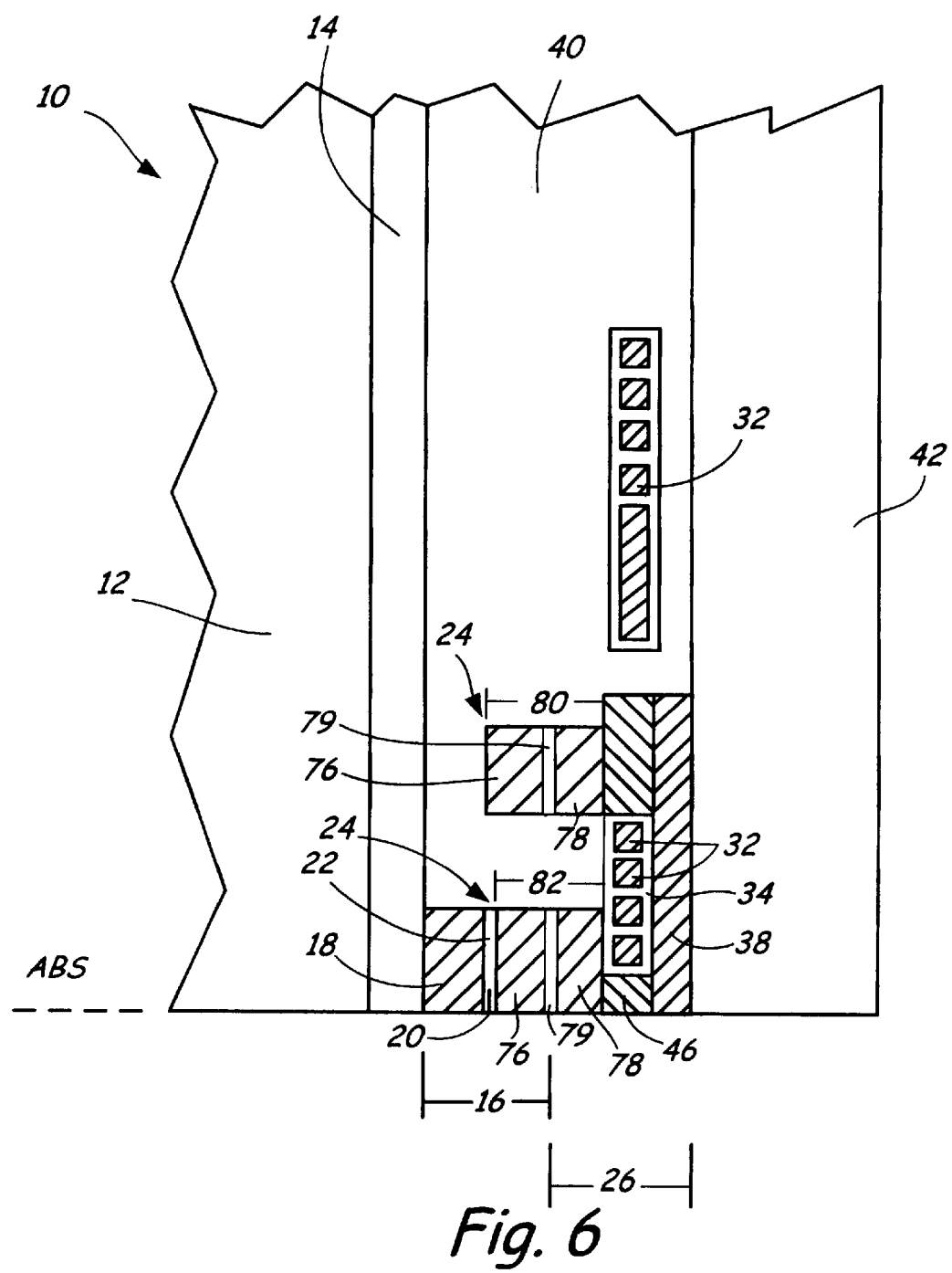
FIG. 6 is a partial cross-sectional view of another embodiment of the transducing head of the present invention.

FIG. 6 is a partial cross-sectional view of another embodiment of transducing head 10 of the present invention taken substantially normal to the ABS. Transducing head 10 includes substrate 12, basecoat 14, reader 16 (which includes bottom shield 18, read element 20, read gap 22, and shared pole 24), writer 26 (which includes shared pole 24, shared pole extension 46, back via 30, conductive coil 32, coil insulator 34, and top pole 38), insulating layer 40, and overcoat 42. Shared pole 24 is shown in a trilayered configuration, including a top shield 76 and a bottom pole 78 in piggyback configuration separated by a non-magnetic spacer 79.

Similar to the embodiment shown in FIG. 2, top shield 76, bottom pole 78 and spacer 79 of transducing head 10 are separated into two pieces, a yoke portion 80 and a shield portion 82. Shield portion 82 is located adjacent the ABS and yoke portion 80 is recessed from the ABS, co-planar to and spaced apart from shield portion 82 by a gap. Bottom shield 18 is a single piece upon which shield portion 82 of shared pole 24 is positioned. Bottom shield 18 has a height substantially equal to the height of shield portion 82. The reduced height of bottom shield 18, top shield 76, bottom pole 78, and spacer 79 adjacent the ABS reduces the volume of high CTE material that contributes to TPTR, thereby reducing thermal protrusion. There is no bottom shield portion positioned beneath yoke portion 80 of shared pole 24.

Shared pole extension 46 is formed upon shield portion 82 of bottom pole 78 adjacent the ABS and centered about the centerline of transducing head 10. Back via 30 is formed on yoke portion 80 of bottom pole 78. A write gap is defined between shared pole extension 46 and top pole 38 at the ABS. Top pole 38 is formed over shared pole extension 46 and extends from shared pole extension 46 at the ABS to back via 30. Conductive coil 32 is positioned in coil insulator 34 between top pole 38 and shield portion 82 of bottom pole 78, wrapping around back via 30, such that the flow of electrical current to conductive coil 32 generates a magnetic field across the write gap.

Figure 7:
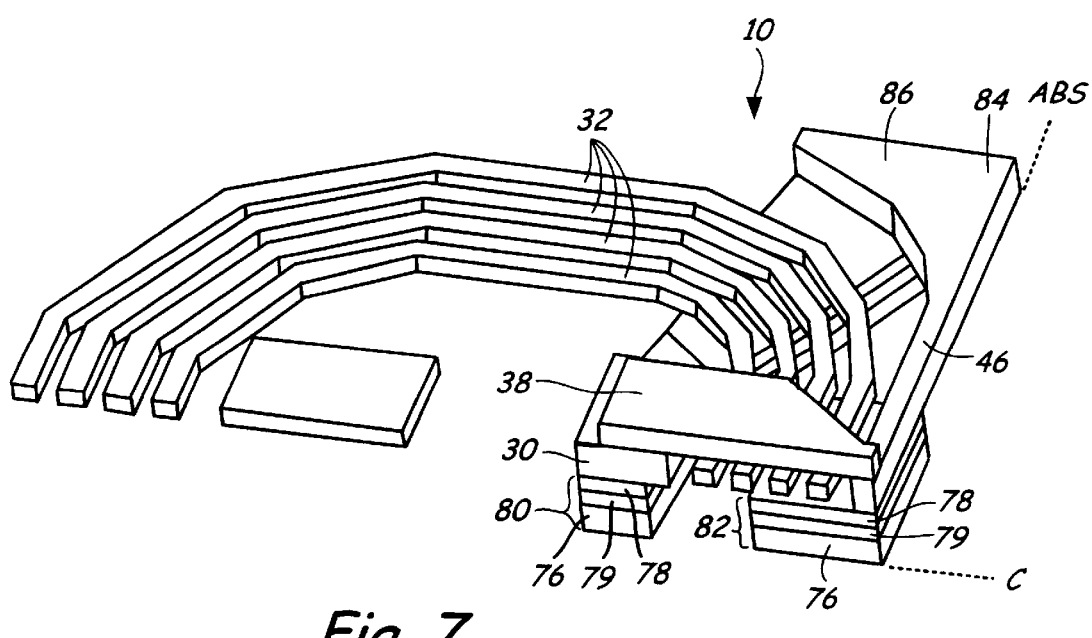
FIG. 7 is a top perspective view of a section of the transducing head of FIG. 6 cut along the centerline of the head.

FIG. 7 is a top perspective view of a section of transducing head 10 cut along a centerline C of head 10, transducing head 10 being the embodiment shown in FIG. 6. For ease of illustration, FIG. 7 does not include all the necessary features of transducing head 10, such as the substrate, the basecoat, the bottom shield and the insulating layer. To better illustrate the different layers of transducing head 10, only half of transducing head 10 is shown in FIG. 6, and the other half would be a mirror image of the half shown in FIG. 7, but located on the opposite side of centerline C.

Positioned adjacent the ABS is shield portion 82 of top shield 76, bottom pole 78 and spacer 79. Recessed from the ABS, co-planar with and spaced apart from shield portion 82 is yoke portion 80 of top shield 76, bottom pole 78 and spacer 79. Yoke portion 80 of top shield 76, bottom pole 78 and spacer 79 extends from centerline C of transducing head 10 in opposite directions, although only one end is shown in FIG. 7, away from centerline C towards the ABS. Yoke portion 80 is also recessed from the ABS at first and second ends 64, 66.

Back via 30 is positioned upon yoke portion 80 of bottom pole 78. Back via 30 is adjacent centerline C of transducing head 10 and recessed from the ABS. Shared pole extension 46 is positioned upon shield portion 82 of bottom pole 78, adjacent the ABS. Shared pole extension 46 extends from centerline C in opposite directions to a first end 84 and a second end (not shown), although only first end 84 is shown in FIG. 7, along the ABS. Each end of shared pole extension 46 includes a portion 86 having a height greater than a height of shared pole extension 46 adjacent centerline C. Each portion 86 at the ends of shared pole extension 46 extend away from the ABS to contact the ends of yoke portion 80 of bottom pole 78.

Top pole 38 is positioned on top of back via 30 and shared pole extension 46 to extend from shared pole extension 46 adjacent the ABS to back via 30. Coil 32 is nested between top pole 38 and shield portion 82 of bottom pole 78, and wraps around back via 30 such that the flow of electrical current through conductive coil 32 generates a magnetic field across the write gap.

Magnetic circuit of writer 26 includes shield portion 82 of bottom pole 78, shared pole extension 46, yoke portion 80 of bottom pole 78, back via 30 and top pole 38. Non-magnetic spacer 79 separates the reader from the writer. The magnetic flux flows through shield portion 82 of bottom pole 78, to shared pole extension 46, to yoke portion 80 of bottom pole 78, to back via 30, to top pole 38 and then back to shared pole extension 46 to complete the magnetic circuit from bottom pole 78 to top pole 38. Shared pole extension 46 and yoke portion 80 of bottom pole 78 maintain the complete magnetic circuit between bottom pole 78 and top pole 38.

The present invention is a data transducer having a structure that reduces the TPTR when the transducing head is operated at high temperatures, while maintaining a complete magnetic writer circuit between the bottom pole and the top pole. The shared pole of the data transducer is split into two separate pieces which are connected together by a shared pole extension. A first portion, or shield portion, of the shared pole is located adjacent the ABS of the data transducer, and a second portion, or yoke portion, is recessed from the ABS, co-planar to and spaced apart from the shield portion. A gap is formed between the shield portion and the yoke portion. The shield portion has a reduced height from prior art shared poles which reduces the volumetric contribution to TPTR of the high CTE material forming the shared pole. Also, recessing the yoke from the air bearing surface minimizes the contribution to TPTR while maintaining the write function of the data transducer. Furthermore, the shared pole extension connecting the shield portion to the yoke portion maintains a complete magnetic circuit between the bottom pole and the top pole.

Although the present invention has been described with reference to preferred embodiments, workers skilled in the art will recognize that changes may be made in form and detail without departing from the spirit and scope of the invention.

What is claimed is:

1. A data transducer having an air bearing surface and comprising:
    a write via;
    a top pole having one end adjacent the air bearing surface and an opposite end contacting the write via;
    a yoke extending from the write via in two directions towards the air bearing surface, the yoke being recessed from the air bearing surface and having a first end and a second end;
    a shared pole adjacent the air bearing surface and coplanar to the yoke wherein a gap is located between the shared pole and the yoke; and
    a shared pole extension extending between the shared pole and the first and second ends of the yoke.

2. The data transducer of claim 1 wherein the shared pole has a width between about 12 microns and about 20.5 microns.

3. The data transducer of claim 1 wherein the shared pole has a height between about 5 microns and about 10 microns.

4. The data transducer of claim 1 wherein the yoke is V-shaped.

5. The data transducer of claim 1 wherein the shared pole extension is positioned adjacent the air bearing surface and includes first and second portions extending rearward and contacting the first and second ends of the yoke, respectively.

6. A magnetic head having an air bearing surface and comprising:
    a substrate;
    a basecoat positioned upon the substrate;
    a data transducer positioned upon the basecoat adjacent the air bearing surface, the data transducer comprising:
        a shared pole including a shield portion adjacent the air bearing surface and a yoke portion positioned co-planar to the shield portion wherein the yoke portion is recessed from the air bearing surface;
        a shared pole extension extending between the shield portion and the yoke portion;
        a top pole separated from the shield portion at the air bearing surface by a write gap and in contact with the yoke portion opposite the air bearing surface;
        a conductive coil arranged such that at least a portion of the conductive coil is positioned between the shield portion and the top pole; and
        a coil insulator positioned between the shared pole and the top pole for insulating the conductive coil therefrom.

7. The magnetic head of claim 6, and further comprising an overcoat positioned upon the data transducer.

8. The magnetic head of claim 6 wherein the shield portion is comprised of a bottom pole layer positioned upon a top shield layer.

9. The magnetic head of claim 8, and further comprising a bottom shield positioned adjacent the top shield.

10. The magnetic head of claim 6 wherein the yoke portion is comprised of a bottom pole layer positioned upon a top shield layer.

11. The magnetic head of claim 6 wherein the yoke portion extends from a back via of the data transducer towards the air bearing surface.

12. The magnetic head of claim 6, and further comprising a gap located coplanar to and between the shield portion and the yoke portion.

13. A magnetic head having an air bearing surface, the magnetic head comprising:

a write via;

a bottom pole positioned adjacent the air bearing surface;

a top pole having one end adjacent the air bearing surface and an opposite end contacting the write via;

a yoke extending from the write via in two substantially opposite directions towards the air bearing surface and being recessed from the air bearing surface wherein the yoke is coplanar with the bottom pole;

a bottom pole extension positioned adjacent the air bearing surface and extending between the bottom pole and the yoke wherein the bottom pole extension is positioned upon the bottom pole and the yoke;

a conductive coil arranged such that at least a portion of the conductive coil is positioned between the first portion of the bottom pole and the top pole;

a coil insulator positioned between the bottom pole and the top pole for insulating the conductive coil;

a write gap positioned adjacent the air bearing surface between the top pole and the bottom pole extension; and a write element positioned within the write gap and adjacent the air bearing surface.

14. The magnetic head of claim 13 wherein the bottom pole has a width between about 12 microns and about 20.5 microns.

15. The magnetic head of claim 13 wherein the bottom pole has a height between about 5 microns and about 10 microns.

16. The magnetic head of claim 13 wherein the yoke has a first end and a second end, the first and second ends being recessed from the air bearing surface.

17. The magnetic head of claim 16 wherein the bottom pole extension includes first and second portions extending away from the air bearing surface and contacting the first and second ends of the yoke, respectively.

18. The magnetic head of claim 13 wherein the yoke is V-shaped.

19. The magnetic head of claim 13 wherein the yoke is comprised of a bottom pole layer.

* * * * *